(12) United States Patent
Nachenberg et al.

(10) Patent No.: US 10,469,509 B2
(45) Date of Patent: Nov. 5, 2019

(54) GATHERING INDICATORS OF COMPROMISE FOR SECURITY THREAT DETECTION

(71) Applicant: Chronicle LLC, Mountain View, CA (US)

(72) Inventors: Carey Stover Nachenberg, Manhattan Beach, CA (US); Maxime Lamothe-Brassard, Mountain View, CA (US); Shapor Naghibzadeh, San Francisco, CA (US)

(73) Assignee: Chronicle LLC, Mountain View, CA (US)

( * ) Notice: Subject to any disclaimer, the term of this patent is extended or adjusted under 35 U.S.C. 154(b) by 272 days.

(21) Appl. No.: 15/394,377

(22) Filed: Dec. 29, 2016

(65) Prior Publication Data

US 2018/0191747 A1 Jul. 5, 2018

(51) Int. Cl.
*G06F 21/00* (2013.01)
*H04L 29/06* (2006.01)

(52) U.S. Cl.
CPC ...... *H04L 63/1416* (2013.01); *H04L 63/1408* (2013.01); *H04L 63/20* (2013.01)

(58) Field of Classification Search
CPC . H04L 63/1416; H04L 63/1408; H04L 63/20; H04L 29/06911; H04L 29/06925; H04L 29/06931; H04L 29/06938; G06F 21/55
See application file for complete search history.

(56) References Cited

U.S. PATENT DOCUMENTS

| | | | |
|---|---|---|---|
| 8,095,968 B2 * | 1/2012 | Cortopassi | G07C 9/00182 726/5 |
| 8,813,228 B2 | 8/2014 | Magee et al. | |
| 9,009,827 B1 | 4/2015 | Albertson et al. | |
| 2006/0128406 A1 | 6/2006 | MacArtney | |
| 2015/0163121 A1 | 6/2015 | Mahaffey et al. | |
| 2015/0172300 A1 | 6/2015 | Cøchenour | |
| 2015/0373039 A1 * | 12/2015 | Wang | H04L 63/1425 726/23 |

(Continued)

OTHER PUBLICATIONS

International Search Report and Written Opinion issued in International Application No. PCT/US2017068500, dated Apr. 17, 2018, 9 pages.

*Primary Examiner* — Ellen Tran
*Assistant Examiner* — Helai Salehi
(74) *Attorney, Agent, or Firm* — Fish & Richardson P.C.

(57) ABSTRACT

The subject matter of this specification generally relates to computer security. In some implementations, a method includes receiving indicators of compromise from multiple security data providers. Each indicator of compromise can include data specifying one or more characteristics of one or more computer security threats. Each indicator of compromise can be configured to, when processed by a computer, cause the computer to detect the presence of the specified one or more characteristics of the one or more computer security threats. Telemetry data for computing systems of users can be received. The telemetry data can include data describing at least one event detected at the computing system. A determination is made that the telemetry data for a given user includes the one or more characteristics specified by a given indicator of compromise.

20 Claims, 3 Drawing Sheets

(56) References Cited

U.S. PATENT DOCUMENTS

| | | |
|---|---|---|
| 2015/0373043 A1 | 12/2015 | Wang et al. |
| 2016/0080408 A1 | 3/2016 | Coleman et al. |
| 2016/0269434 A1 | 9/2016 | DiValentin et al. |
| 2016/0342477 A1* | 11/2016 | Swierk ................ G06F 11/1417 |

* cited by examiner

GATHERING INDICATORS OF COMPROMISE FOR SECURITY THREAT DETECTION

TECHNICAL FIELD

This disclosure generally relates to computer and network security.

BACKGROUND

Computers and data communication networks are often subjected to intrusion attacks. An intrusion attack may take many forms, such as worms, viruses, phishing, spyware, and the like. In general, all such attacks are facilitated by some form of malicious software. This software is often referred to as malware. Malware attacks can disrupt the operation of computers and/or steal sensitive data. To protect computers from such attacks, network administrators may install security systems, such as anti-virus software and/or firewalls, that detect malware and prevent or mitigate the effects of malware attacks.

SUMMARY

This specification describes systems, methods, devices, and other techniques for gathering indicators of compromise and detecting the presence of security threats in telemetry data for computer systems using the indicators of compromise.

In general, one innovative aspect of the subject matter described in this specification can be implemented in method that includes receiving indicators of compromise from multiple security data providers. Each indicator of compromise can include data specifying one or more characteristics of one or more computer security threats. Each indicator of compromise can be configured to, when processed by a computer, cause the computer to detect the presence of the specified one or more characteristics of the one or more computer security threats. The method can include receiving, from each user of multiple users, telemetry data for a computing system of the user. The telemetry data can include data describing at least one event detected at the computing system. A determination is made, for a given user, that the telemetry data for the given user includes the one or more characteristics specified by a given indicator of compromise. Other embodiments of this aspect include corresponding systems, apparatus, and computer programs, configured to perform the actions of the methods, encoded on computer storage devices.

These and other implementations can optionally include one or more of the following features. Some aspects can include identifying a type of security threat indicated by the given indicator of compromise and selecting, from a set of actions, an action to perform based on the type of security threat indicated by the given indicator of compromise. The set of actions can include one or more of (i) removing the security threat indicated by the given indicator of compromise from the given user's computing system, (ii) initiating a forensic investigation of the user's computing system, and (iii) generating an alert that notifies the user of the security threat indicated by the given indicator of compromise.

Some aspects can include determining a performance score for each indicator of compromise. The performance score for an indicator of compromise can be based at least in part on a number of times the one or more characteristics specified by the indicator of compromise has been detected in the telemetry data of the users. At least one indicator of compromise can be removed from a set of indicators of compromise for which the telemetry data of the users is monitored based on the performance score for the at least one indicator of compromise.

Some aspects can include compensating a given security data provider an amount based on the performance score for each indicator of compromise provided by the given security data provider. The performance score for each indicator of compromise can be based on a difference between (i) a number of true detections of the one or more characteristics specified by the indicator of compromise in the telemetry data of the users and (ii) a number of false detections of the one or more characteristics specified by the indicator of compromise in the telemetry data of the users. The amount can be based on at least one of a relevance of the indicator of compromise or a data processing search cost for identifying the one or more characteristics specified by the indicator of compromise in telemetry data of a user.

Some aspects can include identifying, for a given user, a proper subset of the set of indicators of compromise based on a cost of each indicator of compromise and a budget specified by the user. The telemetry data for the given user can be monitored only for the one or more characteristics specified by the proper subset of indicators of compromise.

Some aspects can include identifying, for a given user, a proper subset of the set of indicators of compromise to which the given user has subscribed. The telemetry data for the given user can be monitored only for the one or more characteristics specified by the proper subset of indicators of compromise.

Some aspects can include updating the computing system of at least one user to provide data related to a given characteristic specified by a received indicator of compromise. At least one indicator of compromise can include a set of rules for evaluating the telemetry data of the users.

In some aspects, the one or more security threats specified by a particular indicator of compromise can include multiple security threats that all belong to a same category of security threat. The one or more security threats specified by a particular indicator of compromise can include multiple security threats that are variants of each other.

Particular embodiments of the subject matter described in this specification can be implemented so as to realize one or more of the following advantages. By assessing the performance of indicators of compromise, a system can filter out those that have low performance (e.g., less than a threshold performance score). This filtering results in a reduction in the number of indicators of compromise that the system uses to identify security threats in telemetry data, which in turn results in a reduction in the amount of computing resources consumed by the system in detecting security threats. By reducing the amount of computing resources consumed in detecting security threats, the system can identify and respond to security threats quicker and more efficiently, which can reduce the damage caused by the security threats. In addition, more computing resources are available to perform other tasks, such as assessing the performance of the indicators of compromise, receiving new indicators of compromise, etc.

By compensating providers of indicators of compromise based on quality and/or performance, the providers are encouraged to provide higher quality and more relevant indicators of compromise, sooner. In addition, basing the performance of indicators of compromise on data processing costs associated with detecting the indicators of compromise in telemetry data, providers are encouraged to provide more efficient indicators of compromise.

Allowing users, such as researchers, incident responders, and information technology professionals, to upload indicators of compromise that include characteristics of security threats that the users have detected or reverse engineered makes previously unavailable security threat data available to others. For example, a user that has identified a security threat can upload an indicator of compromise that specifies characteristics of the security threat rather than generating and selling software that prevents or corrects the threat. This identification and gathering of untapped security threat data enables threat detections to be more robust and capable of detecting more security threats and new security threats faster.

Various features and advantages of the foregoing subject matter is described below with respect to the figures. Additional features and advantages are apparent from the subject matter described herein and the claims.

DETAILED DESCRIPTION

In general, this disclosure describes systems, methods, devices, and other techniques for gathering indicators of compromise ("IOCs") and using the IOCs to identify computing systems that have been compromised, e.g., by a malware or hacking attack. A system can enable users, such as researchers, incident responders, information technology professionals, and other users, to upload and share IOCs that can be used to identify compromised computing systems. An IOC can specify one or more characteristics of a computer security threat. For example, a user may reverse engineer a new botnet and generate an IOC that specifies characteristics of the new botnet.

The system can assess the performance of the IOCs and filter out low performing IOCs or block providers of low performing IOCs. Thus, the system enables the rapid evaluation of multiple different IOCs. In addition, IOCs that are most effective relative to other IOCs emerge based on their performance. This contributes to the technical field of security detection and mitigation, as the system enables the quick and reliable evaluation of various competing IOCs and identifies the best performing IOCs.

The users that upload the IOCs can be incentivized to construct high performing IOCs that are relevant to actual security threats. For example, a "leaderboard" may list users that design high performing IOCs and that agree to be included in the leaderboard. Users may even be compensated for high performing IOCs, e.g., for IOCs that have been used to detect at least a threshold number of security threats in computing systems. Such high performing IOCs may be further evaluated to reveal "best practices" for IOC design, thus contributing to the technical field of security detection and mitigation.

A subscriber can subscribe to only certain IOCs or to all of the IOCs. The system can then monitor data describing events that have occurred at the subscriber's computing system, e.g., telemetry data received from the computing system, using the IOCs to which the subscriber has subscribed. The users that provided these IOCs can receive a portion of the subscription fee based on the performance of the IOCs. In some implementations, the system may select the IOCs for a subscriber based on costs of the IOCs and a budget specified by the subscriber.

Figure 1:
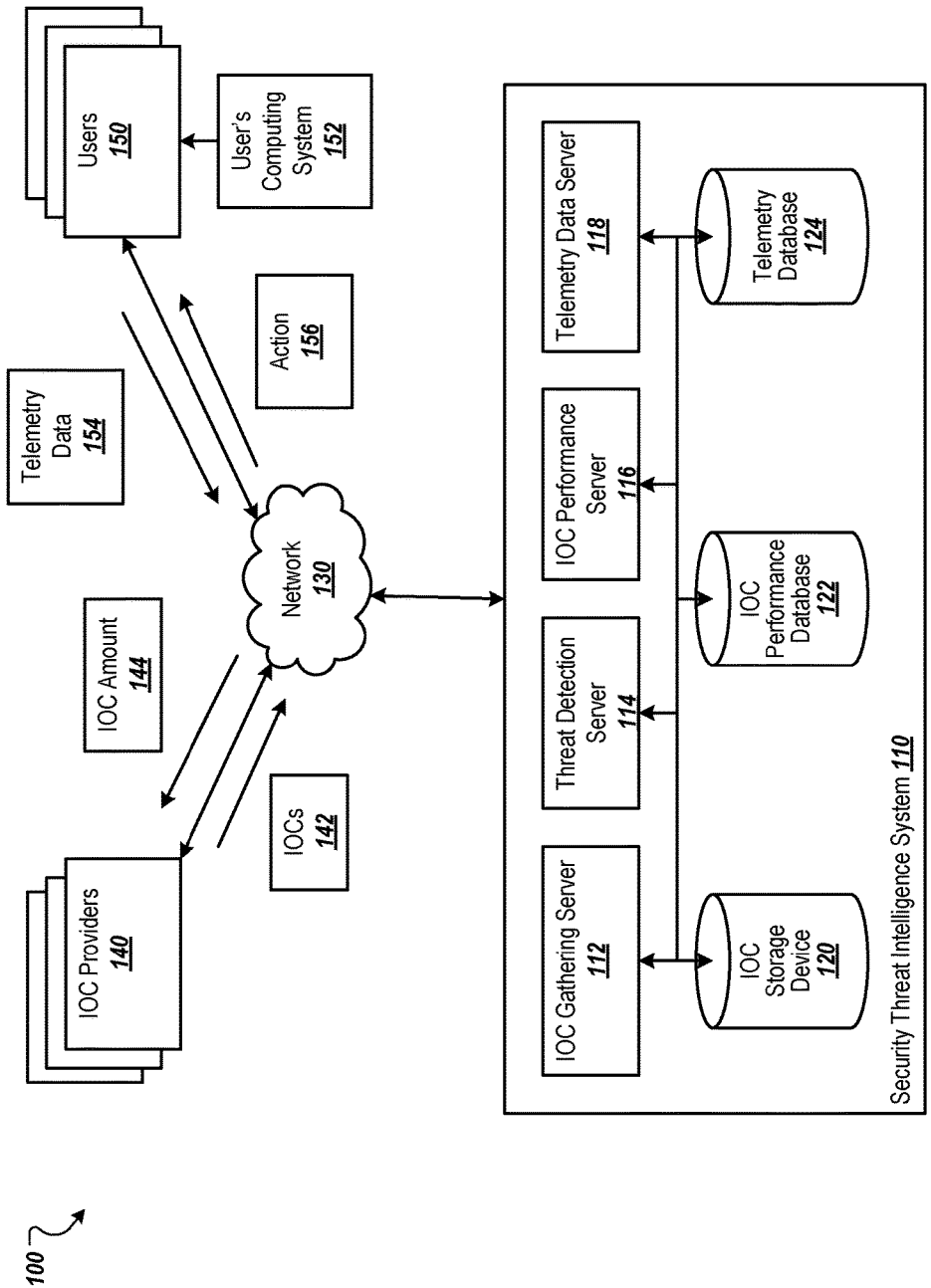
FIG. 1 depicts an example environment in which a security intelligence system receives indicators of compromise and uses the indicators of compromise to detect security threats.

FIG. 1 depicts an example environment 100 in which a security threat intelligence system 110 receives IOCs 142 and uses the IOCs 142 to detect compromised computing systems. In general, an IOC 142 specifies one or more characteristics of one or more security threats. The characteristics can include static data, such as a source of the security threat (e.g., a domain, URL, or IP address for the security threat), files associated with the security threat, file characteristics, scripting, regex, and/or other appropriate static characteristics of a security threat. The characteristics can also include in-memory signatures, dynamic characteristics (e.g., based on a behavioral profile), and/or network indicators. The characteristics could also include a machine learning model, such as a neural network, support vector machine, or decision tree which detects one or more threats.

An IOC 142 may specify one or more characteristics of a category of security threats. For example, a category of security threats may have the same or overlapping characteristics. An IOC 142 may specify one or more characteristics of variants of a particular security threat. For example, the variants may have the same or overlapping characteristics. An IOC 142 can specify an algorithm or set of rules that detects variants of a threat, rather than just as single threat.

An IOC 142 can include data including instructions that, when processed by a computer, cause the computer to detect the presence of the one or more characteristics specified by the IOC 142. For example, when a computer accesses an IOC 142 that specifies an IP address, the computer may automatically evaluate event data for one or more computing systems to determine whether the event data includes events related to the IP address (e.g., a log entry indicating that data was sent to or received from the IP address). As described in more detail below, event data for a computing system can be included in telemetry data received from the computing system.

In some implementations, an IOC 142 can include a hash function for mapping event data describing events that have occurred at a computing system to characteristics of security threats. In this example, when a computer processes the hash function, the hash function may cause the computer to map event data to characteristics of security threats.

An IOC 142 can also include one or more rules for identifying characteristics of security threats in event data describing events that have occurred at a computing system. For example, a rule may specify a set of one or more characteristics that, if identified in the event data, represents a security threat. A rule may also specify what portions of the event data such characteristics may be found. For example, the rule may specify that if a particular file characteristic is found in a particular file, then a particular security threat or attack is present in the computing system. A rule can include instructions that, when executed by a computer, cause the computer to detect the presence of one or more characteristics specified by the rule in event data for a computing system.

A rule-based IOC 142 can include a set of rules for identifying combinations of characteristics in event data. For example, the set of rules may evaluate static characteristics (e.g., IP addresses), in-memory signatures, and/or behavioral profiles of a computing system. In a particular example, the rule may specify that if a file characteristic is found in a particular file and an in-memory signature is found in a particular memory region, then a particular security threat or attack is present in the computing system and thus, the computing system is compromised. To determine whether a computing system includes an in-memory signature, the security threat intelligence system 110 can send code to the computing system that scans the computing system's memory, e.g., for running or loaded binaries, and provides the in-memory signature back to the security threat intelligence system 110.

In some implementations, the security threat intelligence system 110 may provide a rule definition language that enables IOC providers 140 to define rule-based IOCs 142. For example, the language may be a regular expression based toolset, such as YARA. An IOC provider 140 can use the language to construct IOCs 142 and provide the IOCs 142 to the security threat intelligence system 110. For example, the security threat intelligence system 110 may provide a user interface that allows IOC providers 140 to construct IOCs 142, including rule-based IOCs.

The security threat intelligence system 110 includes an IOC gathering server 112 that receives the IOCs 142 from the IOC providers 140 over a data communication network 130, e.g., a local area network (LAN), a wide area network (WAN), the Internet, a mobile network, or a combination thereof. The IOC providers 140 can include researchers, incident responders, information technology professionals, amateurs, or other users that have knowledge of a security threat or a class of threats. For example, an IOC provider 140 may reverse engineer a botnet, malicious software, or other security threat and identify characteristics of the security threat. In another example, an IOC provider 140 may identify an IP address from which malicious code is being sent to computing systems. The IOC provider 140 can generate an IOC 142 that specifies the characteristics of the security threat and send the IOC 142 to the IOC gathering server 112. For example, as mentioned above, the IOC providers 140 may construct IOCs 140 using a user interface provided by the security threat intelligence system 110.

The IOC gathering server 112 can store received IOCs 140 in an IOC storage device 120, e.g., a hard drive, flash memory, etc. In some implementations, the IOC gathering server 112 may evaluate received IOCs 140 prior applying the IOCs 140 in user-contributed telemetry data. For example, the IOC gathering server 112 may compare a received IOC 142 and/or its provider to a whitelist that specifies legitimate software and/or trusted IOC providers. If the received IOC matches a file in the whitelist of legitimate software, or the IOC provider does not match an IOC provider specified by the whitelist, the IOC gathering server 112 may discard the received IOC.

The security threat intelligence system 110 may monitor computing systems 152 of users 150 using the IOCs 142 to detect whether the computing systems 152 have been compromised. The computing systems 152 monitored by the threat detection server 114 may be computing systems 152 of users 150 that have subscribed to a threat detection service provided by the security threat intelligence system 110.

The security threat intelligence system 110 includes a threat detection server 114 that uses the IOCs 140 to identify computing systems 152 that have been compromised. For the purposes of this document, a compromised computing system is a computer, network, or other appropriate computing system that has been subjected to a security threat or attack. A compromised computing system may be a computing system in which evidence of a security threat or attack can be detected. For example, a computing system that has been attacked, and thus has been compromised, may have malware, adware, spyware, or other malicious code installed thereon by a malicious actor. A computing system that has been subjected to a security threat may have connected to a domain or URL associated with a known malicious actor but may have not yet been attacked by the malicious actor. An IOC 142 may specify, as a characteristic of a security threat, the domain or URL of the malicious actor and the threat detection server 140 may detect connections to the domain or URL in event data for the computing system.

The threat detection server 114 can identify computing systems that have been compromised based on telemetry data 154 received from the computing systems 152. The telemetry data 154 provided by a computing system 152 can include event data that describes events detected at the computing system 152. For example, the telemetry data 154 can include a log of network connections to other devices. The log can include data specifying IP addresses, URLs, and/or domains connected to by the computing system 152. In another example, the telemetry data 154 provided by a computing system 152 can also include files that have been stored or modified at the computing system 152, characteristics of the files, in-memory signatures, behavioral characteristics of the computing system 152, and/or other appropriate data describing events that have occurred at the computing system 152.

In some implementations, a telemetry data server 118 of the security threat intelligence system 110 may provide software, software modules, scripts, or other code to the computing systems 152. This code can, when executed by the computing systems 152, identify appropriate data to include in the telemetry data 154 and provide the telemetry data 154 to the telemetry data server 118. In turn, the telemetry data server 118 may store the telemetry data 154 for each computing system 152 in a telemetry database 124.

The telemetry data server 118 may update the code for identifying and providing telemetry data 154 based on new IOCs 142 received by the IOC gathering server 112. For example, if a new IOC 142 specifies a type of characteristic for which data is not being provided by a computing system 152, the telemetry data server 118 may update or generate new code that causes the computing systems 152 to identify and provide data related to the characteristic. In a particular example, a new IOC 142 may specify a particular file that is being stored on computing systems to steal sensitive data. In this example, the telemetry data server 118 may update the code to scan the computing systems for the particular file, and if found, provide the file to the telemetry data server 118. In another example, a new IOC 142 may specify particular computer settings that are being adjusted by a malware or hacking attack. In this example, the telemetry data server 118 may send new monitoring rules to the computing systems 152.

An example monitoring rule may cause the computing system to monitor a particular setting (e.g., "setting X") and send telemetry data 154 that specifies the value of the particular setting or changes to the particular setting to the security threat intelligence system 110. By monitoring particular settings identified in IOCs 142 rather than all settings of the computing systems, the performance of the computing systems 152 is improved as monitoring all settings would be computationally expensive. The ability to make granular changes to the monitoring rules based on IOCs 142, new IOCs, and/or update IOCs allows the computing systems 152 to monitor for up to date security threats based on changed settings without degrading the computing systems' ability to perform other tasks.

The threat detection server 114 can use the IOCs 142 stored in the IOC storage device 120 and the telemetry data 154 stored in the telemetry database 124 to identify computing systems that have been compromised. As described in more detail below, the threat detection server 114 may only use a portion of the IOCs (e.g., less than all of the IOCs) for a particular user's computing system. The threat detection server 114 may access the telemetry data 154 for a particular computing system and identify the IOCs for use in detecting whether the particular computing system has been compromised. For each identified IOC, the threat detection server 114 may apply the IOC to the telemetry data 154. For example, the threat detection server 114 may process the data of the IOC 142 to identify the one or more characteristics specified by the IOC. The threat detection server 114 may then evaluate the telemetry data 154 to determine whether each of the one or more characteristics of the security threat specified by the IOC 142 are present in the telemetry data 154. If each of the one or more characteristics are present in the telemetry data 154, the threat detection server 114 may conclude that the computing system 152 has been compromised by the security threat.

If the threat detection server 114 determines that a computing system 152 has been compromised, the threat detection server 114 can determine an action 156 to take in response to the security threat. In some implementations, the threat detection server 114 selects the action 156 from a set of possible actions based on the type of security threat specified by the IOC 142 used to detect the compromise. For example, the set of actions may include removing the security threat from the computing system 152 automatically, initiating a forensic investigation of the computing system 152, or generating an alert that notifies the user 150 of the computing system 152. In a particular example, if the security threat is adware, malware, or spyware, the threat detection server 114 may remove the security threat 152, interact with the computing system 152 so that the computing system 152 removes the security threat, or interact with a third party that removes the security threat from the computing system 152. In another example, if the security threat is complex and/or has infected multiple computers, the threat detection server 114 may initiate a forensic investigation of the computing system 152.

The security threat intelligence system 110 includes an IOC performance server 116 that measures the performance of IOCs 142. For example, the IOC performance server 116 may determine, for each IOC 142, a performance score for the IOC 142 that indicates how well the IOC 142 has performed in detecting compromised computing systems. The performance score for an IOC 142 may be based on the number of times the one or more characteristics specified by the IOC 142 has been detected in telemetry data 154 (or other event data) received from the computing systems 152.

For example, the performance score for an IOC may increase with an increase in the number of times the one or more characteristics specified by the IOC 142 has been detected in telemetry data 154 (or other event data) received from the computing systems 152. The number of times the characteristic(s) are detected in telemetry data 154 indicates the relevance of the IOC and the prevalence of the security threat of the IOC 142.

In some implementations, the performance score of an IOC 142 is based on a number of true positive detections of the characteristic(s) specified by the IOC 142 and/or the number of false positive detections of the characteristic(s) specified by the IOC. For example, the performance score for the IOC 142 may be equal to, or proportional to, a difference between the number of false positive detections and the number of false positive detections. The IOC performance server 116 can determine whether a detection of a IOC is a true positive or false positive by comparing the files, IP address, domains, and/or other detected characteristics to a whitelist of known clean files, IP addresses, domains, and/or other characteristics. If the detected characteristic is on the whitelist, the IOC performance server 116 may determine that the detection is a false positive. In another example, a human evaluator can determine whether a detection is a true positive or false positive by performing a manual investigation of a suspected threat and determining whether a detected characteristic is malicious. If the human evaluator determines that the characteristic is malicious, the human evaluator may determine that the detection is a true positive detection.

The performance score for an IOC 142 may be based on a data processing search cost for determining whether the characteristic(s) specified by the IOC are present in telemetry data 154 for a computing system 152. For example, IOCs 142 that consume more data processing power or more computing resources may have a lower score than IOCs that consume less data processing power or fewer computing resources.

In some implementations, the performance score for an IOC 142 is based on user feedback for the IOC 142. For example, users may receive data specifying detections (and/or non-detections) of security threats in their computing systems based on the IOC 142. The users can investigate their computing systems to determine whether the security threats are actually present and then provide feedback regarding how well the IOC performed in detecting security threats in their computing systems. The IOC performance server 116 can update the performance score for the IOC based on the user feedback.

In some implementations, the performance score for an IOC 142 may be based on the presence or absence of that indicator within even a single customer environment. Some attacks are targeted, meaning they will not be seen in volume across a customer base, yet their detection is highly valuable. Thus, an IOC 142 labeled as being related to a state-sponsored attacker, even seen a handful of times within a customer base would merit a high performance score.

In some implementations, the performance score for an IOC 142 may be based on the freshness of the indicator. For example, the freshness of an IOC 142 may indicate how soon after the threat was first released the IOC 142 was able to detect its presence. IOCs that are fresher have the potential to stop threats early on, before they can cause damage, and therefore are more useful than IOCs covering threats that are older.

The performance score for an IOC 142 can be based on a combination of two or more of the scoring techniques described above. In addition, other appropriate techniques for assessing the performance or quality of IOCs 142 or other security intelligence data can be used to score the IOCs 142. The IOC performance server 116 can store the performance scores for each IOC 142 in an IOC performance database 122.

In some implementations, the IOC performance server 116 determines whether to use IOCs 142 to detect compromised computing systems based on the performance scores for the IOCs 142. For example, the IOC performance server 116 may identify a set of IOCs 142 that are eligible to be used by the threat detection server 114 in detecting compromised computing systems. The IOC performance server 116 may identify, for inclusion in the set of eligible IOCs, IOCs 142 that have a performance score that satisfies (e.g., exceeds) a performance score threshold. In another example, the IOC performance server 116 may identify, for inclusion in the set of eligible IOCs, a specified number of the IOCs 142 having the highest performance scores.

The IOC performance server 116 may remove, from the IOC storage device 120, IOCs 142 that have a performance score that does not satisfy a performance score threshold. In another example, the IOC performance server 116 may inactivate IOCs that have a performance score that does not satisfy the performance score threshold.

In some implementations, users 150 may pay a fee to a security intelligence entity that owns and/or operates the security threat intelligence system 110 to have its telemetry data evaluated using the IOCs 142. The security intelligence entity may provide different types of subscriptions to a threat detections service provided using the security threat intelligence system 110. One type of subscription may allow access to all IOCs 142 being used by the security threat intelligence system 110 without constraint. In this type of subscription, a user 150 may provide a flat amount for the service or provide an amount that is based on the number of security threats detected in the user's telemetry data using the IOCs 142. IOC providers may receive a percentage of the user's subscription amounts, e.g., based on what percentage of the total number of their IOCs are found in the subscribers' computing systems.

Another type of subscription may allow the users 150 subscribe to certain IOCs 142 or to certain IOC providers' IOCs 142. For example, a user may only want its telemetry data 154 evaluated for security threats indicated by a particular type of IOC 142. In this example, a user 150 may pay a fee based on a cost associated with each IOC 142 or IOC provider 140 to which the user 150 has subscribed.

Another type of subscription may allow a user 150 to specify a budget and let the threat detection server 114 select the IOCs 142 for use in evaluating the user's telemetry data. In this example, the threat detection server 114 may select one or more IOCs for the user 150 based on the user's budget, a cost associated with each IOC 142, the performance score for each IOC 142, and/or types of security threats that are most relevant to the user 150.

Another type of subscription may allow a user 150 to pay based on detected security threats. For example, when the threat detection server 114 identifies a security threat in the user's telemetry data 154 using an IOC 142, the threat detection server 114 may notify the user 150 that a security threat was identified and provide a cost for revealing to the user 150 the identified security threat. The cost may be based on a cost associated with the IOC 142 used to detect the security threat. If the user 150 agrees to pay the cost, the threat intelligence server 114 can reveal the security threat to the user 150. In addition, the threat intelligence server 114 may take action to mitigate or remove the security threat, e.g., if agreed to by the user 150. In another example, the user 150 may place a bid amount per each instance of a security threat identified on the user's computing system 152. The threat detection server 114 may use the amount to determine which IOCs to use to evaluate the user's telemetry data 154.

In some implementations, IOC providers 140 are incentivized to provide high performing, reliable, and relevant IOCs 142 to the security threat intelligence system 110. For example, the security threat intelligence system 110 may publish a "leaderboard" of the IOCs 142 that have the highest performance scores. Of course, IOC providers 140 that want to remain anonymous can opt out of any publication of their identity.

In another example, the security intelligence entity may compensate the IOC providers 140, e.g., with money, rewards, discounts on threat monitoring services, or other types of compensation. The amount of compensation for each IOC 142 may be based on the performance of the IOC 142. For example, the amount of compensation for an IOC 142 may be proportional to the performance score for the IOC 142. In a particular example, if the performance score for an IOC 142 is based on a number of times the one or more characteristics specified by the IOC 142 has been detected in telemetry data of the computing systems 152, the amount of compensation may be proportional to the number of times the one or more characteristics specified by the IOC 142 has been detected in telemetry data of the computing systems 152.

In implementations in which users 150 can subscribe to certain IOCs 142 or IOC providers 140, the IOC providers 140 may be compensated an amount based on the number of users who have subscribed to the IOC provider 140 and its IOCs 142. The security intelligence entity can provide an IOC amount 144 of compensation to the IOC providers 140, e.g., periodically.

As IOCs 142 can specify characteristics of actual security threats and attacks, more than one IOC provider 140 may provide the same or similar IOCs 142. In such situations, the threat detection server 114 can select which IOC 142 to use. For example, the threat detection server 114 may select which IOC 142 based on a cost associated with each IOC 142. In this example, the IOC providers 140 may provide, for their IOCs, a cost for using the IOCs to detect the presence of security threats in users' telemetry data 154. In another example, the earliest provider to provide a given IOC 142 will take precedence. The threat detection server 114 may select an IOC based on cost, performance, and/or other appropriate data.

Figure 2:
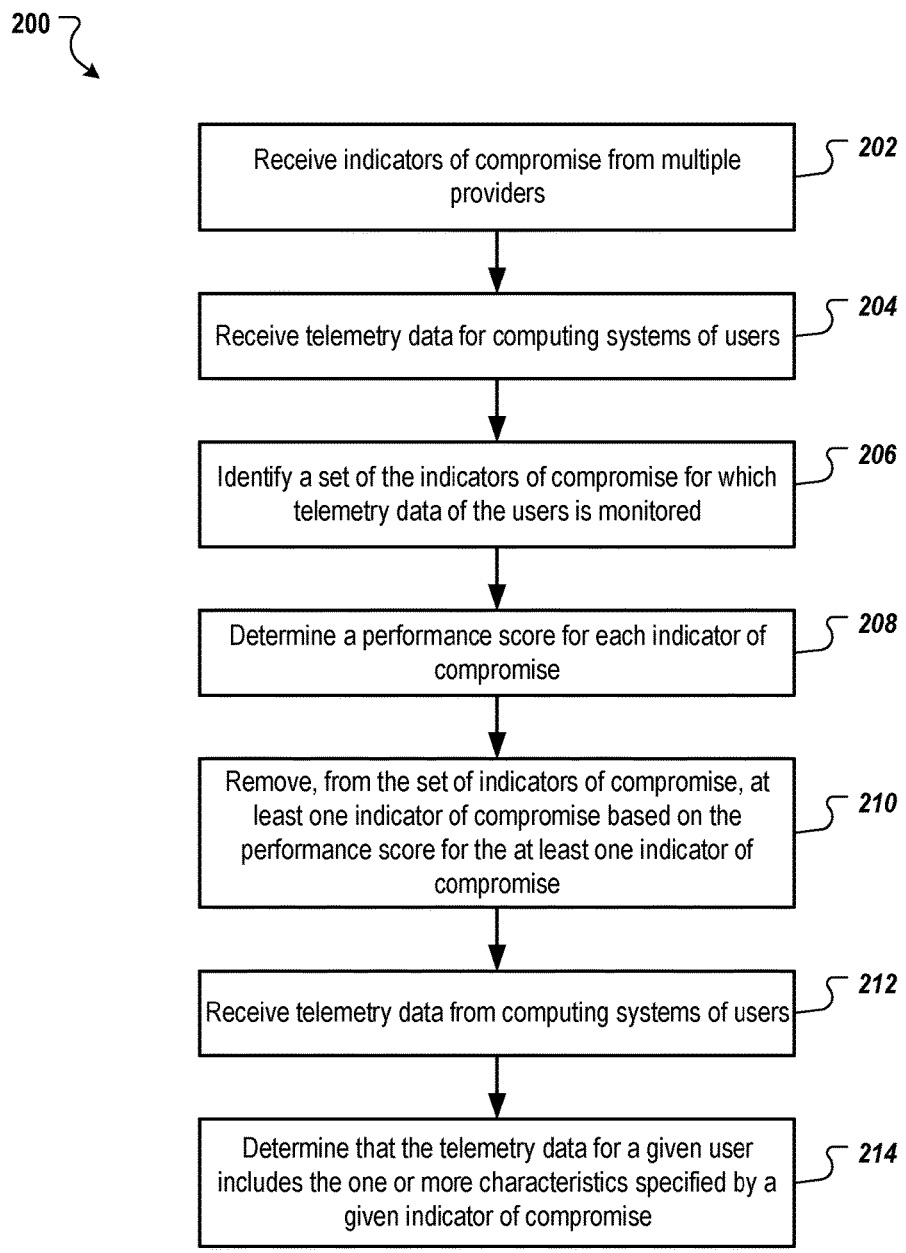
FIG. 2 depicts a flowchart of an example process for assessing the performance of indicators of compromise and removing low performing indicators of compromise from set of indicators of compromise for which telemetry data of users is monitored.

FIG. 2 depicts a flowchart of an example process 200 for assessing the performance of IOCs and removing low performing IOCs from set of IOCs for which telemetry data of users is monitored. Operations of the process 200 can be implemented, for example, by a system that includes one or more data processing apparatus, such as the security threat intelligence system 110 of FIG. 1. The process 200 can also be implemented by instructions stored on a computer storage medium, where execution of the instructions by a system that includes a data processing apparatus cause the data processing apparatus to perform the operations of the process 200.

The threat intelligence system 110 receives IOCs from multiple security data providers (202). The security data providers can be researchers, incident responders, information technology professionals, amateurs, or other users that have knowledge of a security threat. As described above, an IOC can specify one or more characteristics of a security threat. For example, an IOC can include data that, when processed by a computer, causes the computer to detect the presence of the one or more characteristics specified by the IOC.

The security data providers can define and/or upload IOCs through a portal or user interface provided by the threat intelligence system 110. The security data provider can also identify or select a type of security threat indicated by the IOC and/or a severity of the IOC. In some implementations, the threat intelligence system 110 may provide an amount that the security data provider may receive for true positive detections of the security threat on computing systems of users of the threat intelligence system 110. This amount can be adjusted, for example, based on a number of false positive detections and/or a performance score for the IOC. For example, the amount may be based on a difference between the number of true positive detections and false positive detections. Or, for example, all compensation for an IOC may be revoked for a false positive impacting over a threshold number of users.

The threat intelligence system 110 receives telemetry data for computing systems of users (204). For example, users that want the threat intelligence system 110 to monitor their computing systems for compromises may enable their computing systems to provide telemetry data to the threat intelligence system 110. The telemetry data for a user's computing system can include event data that describes events that have occurred at the computing system. In some implementations, the telemetry data may be received as a stream or a feed.

The threat intelligence system 110 identifies a set of IOCs for which telemetry data of the users is being monitored (206). For example, the threat intelligence system 110 may only monitor telemetry data of users' computing system using a set of IOCs that have been determined to be effective in identifying compromised computing systems. The set of IOCs can include IOCs that are eligible to be used in detecting compromised computing systems. For example, the set of IOCs may include only IOCs that have at least a threshold performance score. By limiting the IOCs to only those that have at least a threshold performance score, the number of false positives can be reduced. In addition, the performance of computing resources of the threat intelligence system 110 used to monitor telemetry data of computing systems using the IOCs can be improved by limiting the monitored IOCs to only those that have at least a threshold performance score. In another example, the set of IOCs may include only IOCs that are provided by a security data provider that is specified by the whitelist.

The threat intelligence system 110 determines a performance score for each IOC in the set of IOCs (208). The performance score for an IOC can indicate how well the IOC has performed in detecting compromised computing systems. As described above, the performance score for an IOC may be based on the number of times the one or more characteristics specified by the IOC has been detected in telemetry data (or other event data) received from computing systems, a number of true positive detections of the characteristic(s) specified by the IOC, the number of false positive detections of the characteristic(s) specified by the IOC, a data processing search cost for determining whether the characteristic(s) specified by the IOC are present in telemetry data for computing systems, user feedback for the IOC, whether the IOC was found within a critical computing system, whether the IOC is related to organized criminals or state-sponsored attackers (and was also detected in at least one system), and/or other appropriate criteria.

The threat intelligence system 110 optionally removes, from the set of IOCs, at least one IOC based on the performance score for the at least one IOC (210). For example, the threat intelligence system 110 may remove, from the set of IOCs, each IOC that has a performance score that does not meet a performance score threshold. In another example, the threat intelligence system 110 may remove, from the set of IOCs, the IOCs that have the lowest performance scores. In this example, the threat intelligence system 110 may remove a specified percentage of the IOCs that have the lowest performance scores. By removing the low performing IOCs, the threat intelligence system 110 can more quickly identify security threats that have compromised computing systems without wasting time scanning for IOCs that are not often present in the computing systems or that generate a large percentage of false positives.

The threat intelligence system 110 receives telemetry data from computing systems of users (212). The telemetry data can include event data that describes events detected at the computing system. For example, the telemetry data can include a log of network connections to other devices, files that have been stored or modified at the computing system, characteristics of the files, in-memory signatures, behavioral characteristics of the computing system, and/or other appropriate data describing events that have occurred at the computing system 152.

The threat intelligence system 110 determines that the telemetry data for a given user includes the one or more characteristics specified by a given IOC (214). For example, the threat intelligence system 110 may monitor the telemetry data for each user using the IOCs in the set of IOCs. As part of the monitoring, the threat intelligence system 110 may compare the characteristic(s) specified by each IOC in the IOCs to characteristics of the computing systems included in the telemetry data. The threat intelligence system 110 may also apply a set of rules of an IOC to the telemetry data for each user to determine whether the telemetry data indicates that the computing system of the user has been compromised. If the computing system of a given user includes each characteristic specified by a given IOC, the threat intelligence system 110 may determine that the given user's computing system has been compromised.

Figure 3:
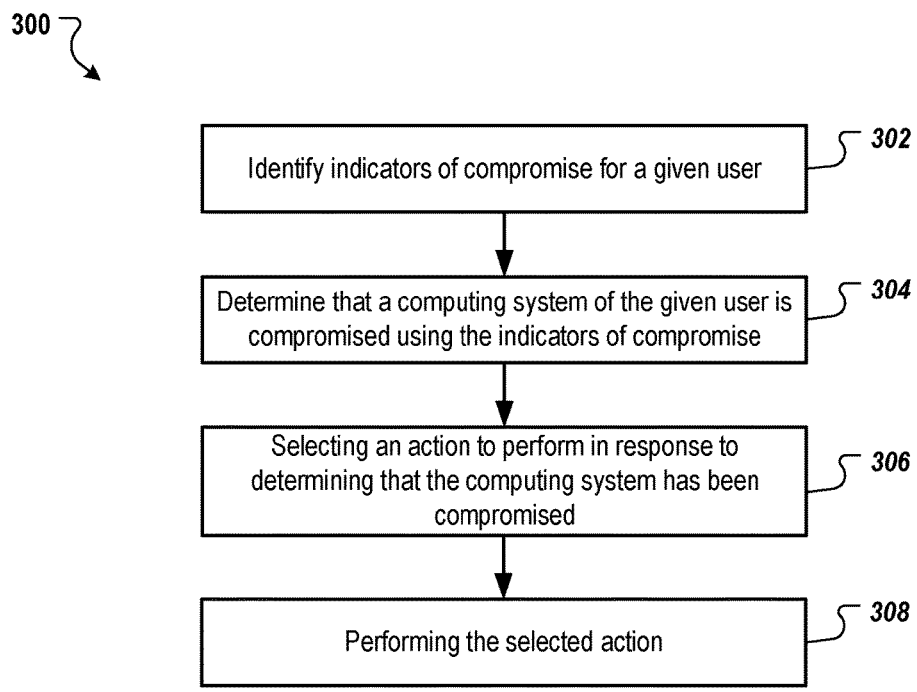
FIG. 3 is a flowchart of an example process for identifying an action to perform in response to determining that a computing system is compromised and performing the action.

FIG. 3 is a flowchart of an example process 300 for identifying an action to perform in response to determining that a computing system is compromised and performing the action. Operations of the process 300 can be implemented, for example, by a system that includes one or more data processing apparatus, such as the security threat intelligence system 110 of FIG. 1. The process 300 can also be implemented by instructions stored on a computer storage medium, where execution of the instructions by a system that includes a data processing apparatus cause the data processing apparatus to perform the operations of the process 300.

The threat intelligence system 110 identifies IOCs for a given user (302). For example, the given user may only subscribe to a proper subset of a set of available IOCs or IOCs provided by only a portion of IOC providers. A proper subset is a subset that includes less than all of the IOCs in the set of IOCs. In another example, the threat intelligence system 110 may identify a proper subset of a set of available IOCs for the given user based on a budget specified by the given user, a cost for each IOC, and/or a performance score for each IOC.

When an IOC provider provides an IOC, the IOC provider may also specify a cost for users to have their telemetry data evaluated using the IOC or an amount that the IOC provider would like to receive from the threat intelligence system 110 for each use of the IOC or detection of a security threat using the IOC. For example, an IOC provider may specify that, for each detection of a security threat using the IOC that the IOC provider would like to receive a certain monetary amount. If the amount for an IOC exceeds a user's budget or would use a large percentage (e.g., at least a threshold percentage) of the user's budget, the system may not select that IOC for the user.

The threat intelligence system 110 determines that a computing system of the given user is compromised using the identified IOCs (304). For example, the threat intelligence system 110 may scan the telemetry data received from the computing system in an attempt to identify the security threat characteristic(s) specified by each identified IOC. If each characteristic specified by a given IOC is detected in the telemetry data, the threat intelligence system 110 may determine that the computing system if compromised by the security threat indicated by the characteristic(s) specified by the given IOC.

The threat intelligence system 110 may scan the telemetry data periodically, e.g., once a day or once an hour. The threat intelligence system 110 may also scan the telemetry data as new telemetry data is received. For example, the telemetry data may be sent in a stream or feed from the computing system. The threat intelligence system 110 may scan the stream or feed as it is received using the identified IOCs.

The threat intelligence system 110 selects an action to perform in response to determining that the computing system has been compromised (306). For example, the threat intelligence system 110 may select an action from a set of possible actions based on the type of security threat specified by the IOC used to detect the compromise and/or the severity of the security threat. For example, the set of actions may include removing the security threat from the computing system automatically, initiating a forensic investigation of the computing system, or generating an alert that notifies the given user.

The threat intelligence system 110 performs the selected action or causes the selected action to be performed (308). For example, if the user has given the system access to the computing system, the threat intelligence system 110 may remove the security threat automatically if that is the selected action. The threat intelligence system 110 may also cause the action to be performed, e.g., by the computing system that has been compromised or a third party.

Figure 4:
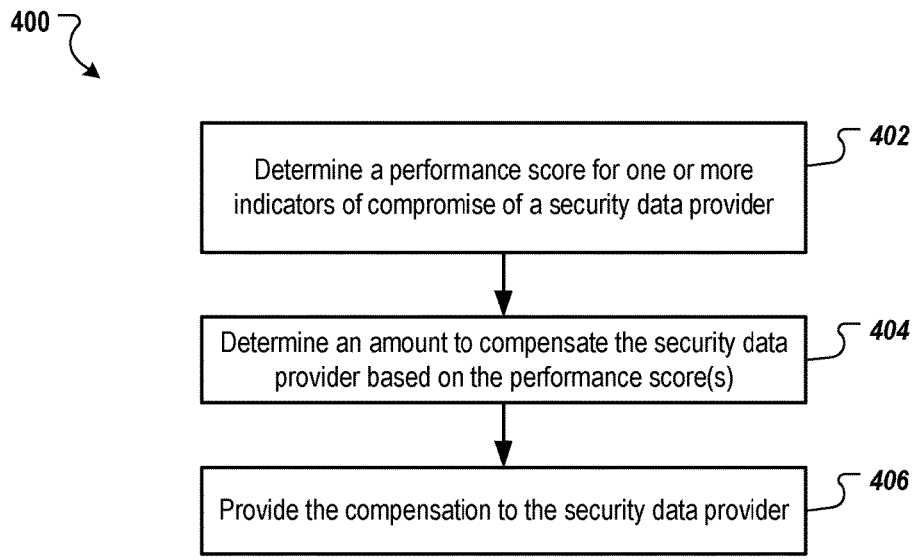
FIG. 4 is a flowchart of an example process for compensating an indicator of compromise provider.

FIG. 4 is a flowchart of an example process 400 for compensating an indicator of compromise provider. Operations of the process 400 can be implemented, for example, by a system that includes one or more data processing apparatus, such as the security threat intelligence system 110 of FIG. 1. The process 400 can also be implemented by instructions stored on a computer storage medium, where execution of the instructions by a system that includes a data processing apparatus cause the data processing apparatus to perform the operations of the process 400.

The threat intelligence system 110 determines a performance score for one or more IOCs of a security data provider (402). As described above, the performance score for an IOC may be based on the number of times the one or more characteristics specified by the IOC has been detected in telemetry data (or other event data) received from computing systems, a number of true positive detections of the characteristic(s) specified by the IOC, the number of false positive detections of the characteristic(s) specified by the IOC, a data processing search cost for determining whether the characteristic(s) specified by the IOC are present in telemetry data for computing systems, user feedback for the IOC, and/or other appropriate criteria.

The threat intelligence system 110 determines an amount to compensate the security data provider based on the performance score(s) (404). For example, the amount for each IOC may be directly proportional to the performance score for the IOC. If the security data provider provided multiple IOCs, the amount may be the sum of the amount for each IOC.

The amount for an IOC may also be based on an amount for each time the IOC was used to successfully identify a security threat on a computing system. For example, the threat intelligence system 110 may specify this amount or the security data provider may specify this amount. The amount for the IOC may be a combination of the number of successfully identifications of a security threat and the performance score for the IOC.

The threat intelligence system 110 provides the compensation to the security data provider (406). For example, the threat intelligence system 110 may credit an account of the security data provider with the determined amount.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for gathering and detecting indicators of compromise, the method comprising:
   receiving, by an indicator of compromise computer of a security threat intelligence system, indicators of compromise from multiple security data providers, each indicator of compromise including data specifying one or more characteristics of one or more computer security threats, each indicator of compromise configured to, when processed by a computer, cause the computer to detect the presence of the specified one or more characteristics of the one or more computer security threats;
   receiving, by a telemetry data component of the security threat intelligence system and from each user of a plurality of users, telemetry data for a computing system of the user, the telemetry data including data describing at least one event detected at the computing system;
   determining, by a threat detection component of the security threat intelligence system, for a given user, that the telemetry data for the given user includes the one or more characteristics specified by a given indicator of compromise;
   determining, by an indicator of compromise component of a security threat intelligence system and for each indicator of compromise, a performance score that is based at least in part on a number of times the one or more characteristics specified by the indicator of compromise has been detected in the telemetry data of the users; and
   providing a given security data provider a reward amount that is based on the performance score for each indicator of compromise provided by the given security data provider.

2. The method of claim 1, further comprising:
   identifying a type of security threat indicated by the given indicator of compromise; and
   selecting, from a set of actions, an action to perform based on the type of security threat indicated by the given indicator of compromise.

3. The method of claim 1, further comprising:
   removing, from a set of indicators of compromise for which the telemetry data of the users is monitored, at least one indicator of compromise based on the performance score for the at least one indicator of compromise.

4. The method of claim 1, wherein the performance score for each indicator of compromise is based on a difference between (i) a number of true detections of the one or more characteristics specified by the indicator of compromise in the telemetry data of the users and (ii) a number of false detections of the one or more characteristics specified by the indicator of compromise in the telemetry data of the users.

5. The method of claim 1, further comprising updating the computing system of at least one user to provide data related to a given characteristic specified by a received indicator of compromise.

6. The method of claim 1, wherein at least one indicator of compromise includes a set of rules for evaluating the telemetry data of the users.

7. The method of claim 1, wherein the one or more security threats specified by a particular indicator of compromise include multiple security threats that all belong to a same category of security threat.

8. The method of claim 1, wherein the one or more security threats specified by a particular indicator of compromise include multiple security threats that are variants of each other.

9. The method of claim 2, wherein the set of actions include one or more of (i) removing the security threat indicated by the given indicator of compromise from the given user's computing system, (ii) initiating a forensic investigation of the user's computing system, and (iii) generating an alert that notifies the user of the security threat indicated by the given indicator of compromise.

10. The method of claim 3, wherein providing the given security data provider a reward amount that is based on the performance score for each indicator of compromise provided by the given security data provider comprises compensating the given security data provider the reward amount.

11. The method of claim 3, further comprising:
for a given user, identifying a proper subset of the set of indicators of compromise based on a cost of each indicator of compromise and a budget specified by the user; and
monitoring the telemetry data for the given user only for the one or more characteristics specified by the proper subset of indicators of compromise.

12. The method of claim 3, further comprising:
for a given user, identifying a proper subset of the set of indicators of compromise to which the given user has subscribed; and
monitoring the telemetry data for the given user only for the one or more characteristics specified by the proper subset of indicators of compromise.

13. The method of claim 10, wherein the reward amount is based on at least one of a relevance of the indicator of compromise or a data processing search cost for identifying the one or more characteristics specified by the indicator of compromise in telemetry data of a user.

14. A system comprising:
a data processing apparatus; and
a computer storage medium encoded with a computer program, the program comprising data processing apparatus instructions that when executed by the data processing apparatus cause the data processing apparatus to perform operations comprising:
receiving indicators of compromise from multiple security data providers, each indicator of compromise including data specifying one or more characteristics of one or more computer security threats, each indicator of compromise configured to, when processed by a computer, cause the computer to detect the presence of the specified one or more characteristics of the one or more computer security threats;
receiving, from each user of a plurality of users, telemetry data for a computing system of the user, the telemetry data including data describing at least one event detected at the computing system; and
determining, for a given user, that the telemetry data for the given user includes the one or more characteristics specified by a given indicator of compromise;
determining, for each indicator of compromise, a performance score that is based at least in part on a number of times the one or more characteristics specified by the indicator of compromise has been detected in the telemetry data of the users; and
providing a given security data provider a reward amount that is based on the performance score for each indicator of compromise provided by the given security data provider.

15. The system of claim 14, wherein the operations further comprise:
identifying a type of security threat indicated by the given indicator of compromise; and
selecting, from a set of actions, an action to perform based on the type of security threat indicated by the given indicator of compromise.

16. The system of claim 14, wherein the operations further comprise:
removing, from a set of indicators of compromise for which the telemetry data of the users is monitored, at least one indicator of compromise based on the performance score for the at least one indicator of compromise.

17. The system of claim 14, wherein the performance score for each indicator of compromise is based on a difference between (i) a number of true detections of the one or more characteristics specified by the indicator of compromise in the telemetry data of the users and (ii) a number of false detections of the one or more characteristics specified by the indicator of compromise in the telemetry data of the users.

18. The system of claim 15, wherein the set of actions include one or more of (i) removing the security threat indicated by the given indicator of compromise from the given user's computing system, (ii) initiating a forensic investigation of the user's computing system, and (iii) generating an alert that notifies the user of the security threat indicated by the given indicator of compromise.

19. The system of claim 16, wherein providing the given security data provider a reward amount that is based on the performance score for each indicator of compromise provided by the given security data provider compensating the given security data provider the reward amount.

20. A non-transitory computer storage medium encoded with a computer program, the program comprising instructions that when executed by one or more data processing apparatus cause the data processing apparatus to perform operations comprising:
receiving indicators of compromise from multiple security data providers, each indicator of compromise including data specifying one or more characteristics of one or more computer security threats, each indicator of compromise configured to, when processed by a computer, cause the computer to detect the presence of the specified one or more characteristics of the one or more computer security threats;
receiving, from each user of a plurality of users, telemetry data for a computing system of the user, the telemetry data including data describing at least one event detected at the computing system; and
determining, for a given user, that the telemetry data for the given user includes the one or more characteristics specified by a given indicator of compromise;
determining, for each indicator of compromise, a performance score that is based at least in part on a number of times the one or more characteristics specified by the indicator of compromise has been detected in the telemetry data of the users; and
providing a given security data provider a reward amount that is based on the performance score for each indicator of compromise provided by the given security data provider.

* * * * *